United States Patent [19]

Asquith et al.

[11] Patent Number: 4,872,414
[45] Date of Patent: Oct. 10, 1989

[54] EMERGENCY SIGNAL BALLOON APPARATUS

[76] Inventors: Janet L. Asquith, 1247 W. San Marcos Blvd., San Marcos, Calif. 92069; Bonnie G. Connor, 745 E. Bradley, No. 53, El Cajon, Calif. 92021

[21] Appl. No.: 203,902
[22] Filed: Jun. 8, 1988
[51] Int. Cl.⁴ .............................................. B64B 1/50
[52] U.S. Cl. ............................ 116/210; 116/DIG. 9; 206/803; 244/33
[58] Field of Search ................. 40/214, 215; 116/210, 116/DIG. 8, DIG. 9; 141/10, 19, 313, 330; 206/573, 803; 222/5; 244/31, 33, 153; 446/220, 222

[56] References Cited

U.S. PATENT DOCUMENTS

| | | | |
|---|---|---|---|
| 2,862,531 | 12/1958 | Walker | 141/317 |
| 3,132,626 | 5/1964 | Reid | 116/210 |
| 3,310,024 | 3/1967 | McConnell | 116/210 |
| 3,727,229 | 4/1973 | Clinger et al. | 343/706 |
| 3,735,723 | 5/1973 | Lutz | 116/210 |
| 3,874,325 | 4/1975 | Cocker, III | 116/210 |
| 3,941,079 | 3/1976 | McNeill | 116/210 |
| 4,094,267 | 6/1978 | Davis, Jr. | 116/210 |
| 4,120,259 | 10/1978 | Wilson | 116/210 |
| 4,295,438 | 10/1981 | Porter | 116/210 |
| 4,586,456 | 5/1986 | Forward | 116/210 |

FOREIGN PATENT DOCUMENTS 2903384 9/1980 Fed. Rep. of Germany ...... 116/210

*Primary Examiner*—William A. Cuchlinski, Jr.
*Assistant Examiner*—W. Morris Worth
*Attorney, Agent, or Firm*—Charles C. Logan, II

[57] ABSTRACT

An emergency signal balloon apparatus having a helium canister, an emergency signal balloon, a predetermined length of tether line, a valve assembly and a two part canister housing within which all of the components can be carried. The balloon is constructed of ultra-light, high-strength material, such as Mylar, and most of it would have an iridescent color, such as hunter's orange, with the upper portion having large wedged shaped sections of a highly reflective silver material. The balloon would further have large black letters, "CALL 911" which is the universal distress telephone number. Each of the letters of the message is bordered with highly reflective material so that when light strikes the material at night the message is clearly reflected and is highly visible.

1 Claim, 1 Drawing Sheet

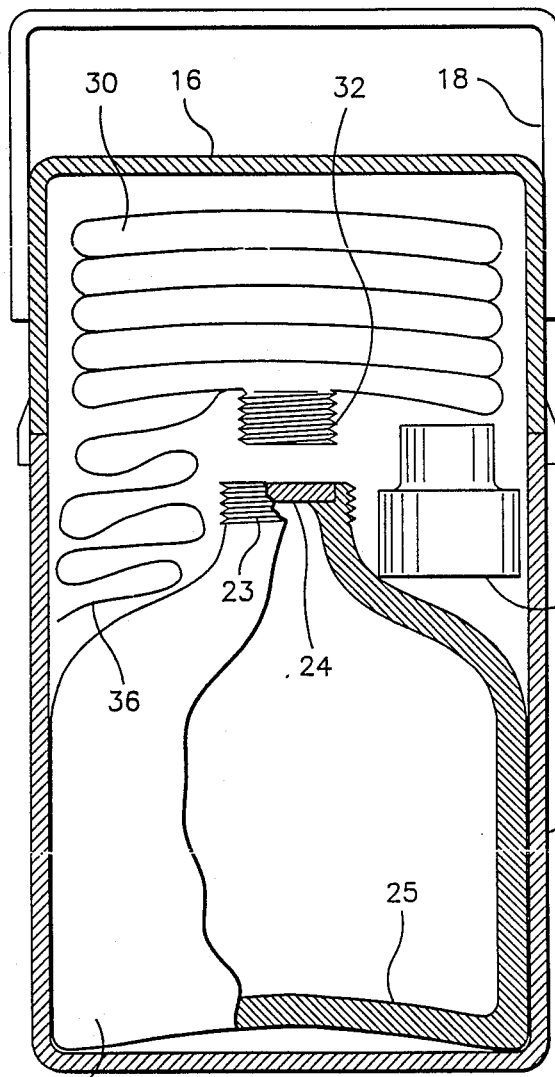
FIG. 1
FIG. 3
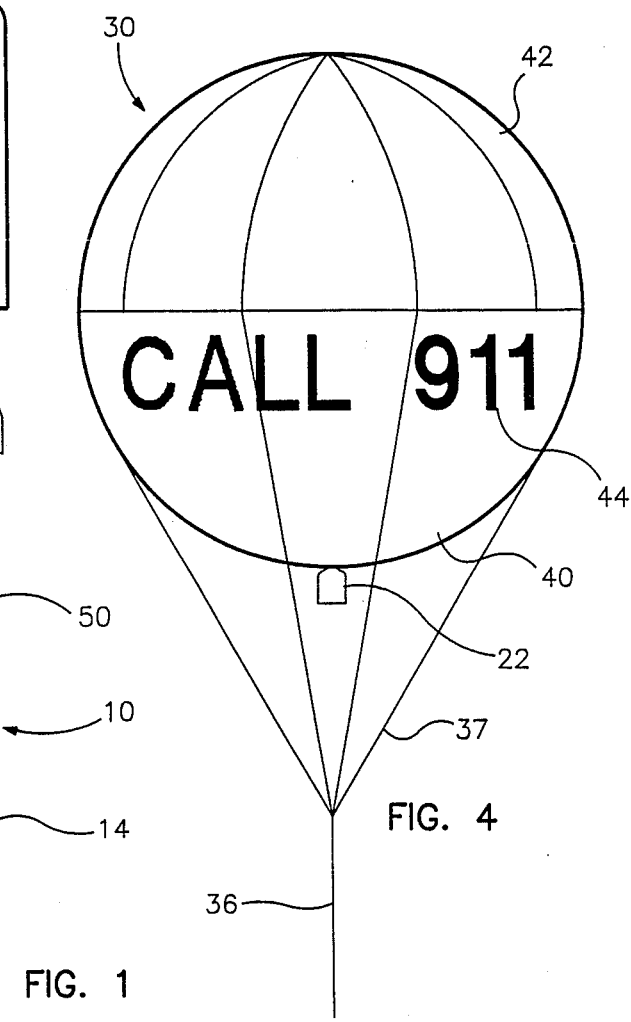
FIG. 4
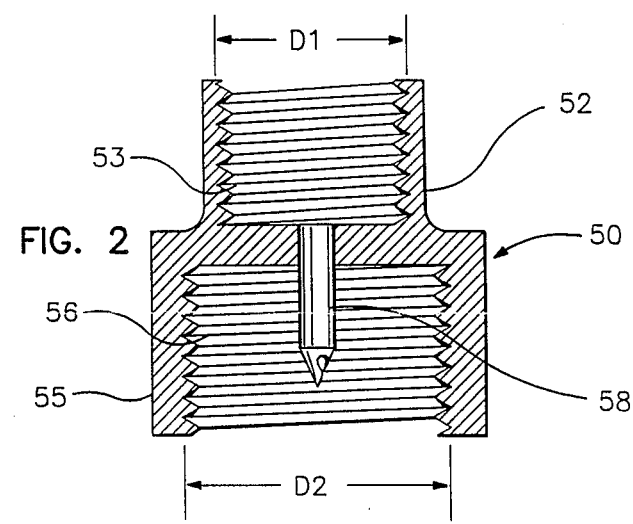
FIG. 2
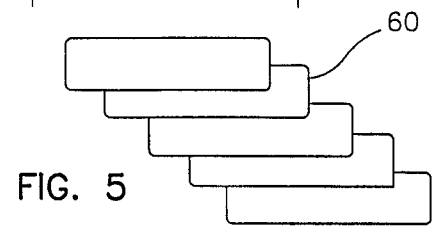
FIG. 5

EMERGENCY SIGNAL BALLOON APPARATUS

BACKGROUND OF THE INVENTION

The invention relates to an emergency signaling device and more specifically to a signal balloon that would be inflated and released into the atmosphere with a tethering line connected thereto.

Knowing that disaster or calamity can occur at anytime the public has installed a universal code in the United States. That code is the 911 system on the telephone. By simply remembering to call 911 in any emergency, properly trained help will be dispatched to the scene of the emergency.

Persons who are in automobiles, boats on the water, and on off-road camping, often encounter emergency situations. When this happens, and there is no two way radio communication available, there is no adequate way of attracting assistance. People have built signal fires, waved flags or arms to attract attention to their plight. The problem is that these methods of attracting help require that the person involved in the emergency situation do something. Action required may be continual broadcasting of a "help needed" message or of attracting attention. The harsh truth is that persons involved in an emergency situation may not be physically able to devote the time and energy to attract emergency assistance.

The invention provides a method of announcing the emergency message with a minimal effort on the behalf of the person involved in the emergency situation. The person in distress need only open the canister of the invention, attach the pressureized helium to the balloon by means of the piercing valve assembly and let go of the balloon. Once the balloon rises, the user need only attach or tie the tether line to some nearby solid object. Attention can then be given to others who may be injured. Should the user lose consciousness the call for help continues. Being universally known as an emergency number, the message on the balloon, "CALL 911" would be recognized as an emergency situation and appropriate action would be quickly taken.

The emergency signal balloon apparatus is simple to transport by boat, car or carried by campers and further being able to be deployed quickly and effectively in case of an accident or emergency. The emergency message is visible from the ground by virtue of the iridescent color of the balloon and from the air by virtue of the highly reflective surfaces on its top half. The message itself also contains reflective surfaces to reflect the light of potential search parties when a search is being conducted at night.

SUMMARY OF THE INVENTION

Applicant's safety device acts as a highly visible signal for help or assistance. The device has a signal balloon which is tethered by a long light-weight, high strength monofilament line, such as used in conventional fishing line. The balloon itself is constructed of ultralight high-strength material, such as Mylar, which will be capable of holding helium gas and of being folded into a small space for storage in the canister housing in its deflated state. The signal balloon would be made of material having an iridescant color, such as hunter's orange, with the upper portion having large wedged shaped sections of highly reflective silver material. The signal balloon further displays in larged letters, "CALL 911" which is the universal distress telephone number. Each of the letters of the message "CALL 911" is bordered with highly reflective material so that when light strikes the material at night, the message, "CALL 911", is reflected back to the light source and is highly visible to anyone passing by.

The emergency signal balloon in its deflated state is carried in a cylindrical canister housing having a handle attached to its upper lid portion. This handle may have the monofilament line of the balloon attached thereto and would provide a way of holding the balloon once it is deployed. Alternatively, the monofilament line could be tied to a permanent or heavy object to secure the balloon. The canister housing has an upper lid portion and a bottom receptacle portion. The balloon is housed in the upper lid portion and it is folded therein along with the deploying tether line such that the mouth of the balloon is accessible when the container is opened. The mouth of the balloon has an externally threaded neck adapter unit attached thereto. The bottom receptacle portion of the container houses the pressurized helium gas canister and the piercing valve assembly. The helium canister is easy to remove when needed for use. The helium canister is sealed at its top with a lead or other soft metal or plastic sealant to allow piercing of the seal and allow the helium to fill the emergency signal balloon. The helium canister is constructed of a material, such as metal or high polymer plastic, which would prohibit leakage of the pressurized helium gas. It would further have an internal coating of sealant such as Mylar to restrict gradual escape of the helium while the apparatus is in storage prior to use.

The piercing valve assembly provides a structure for puncturing or piercing the seal of the helium canister and filling the emergency balloon. The piercing valve assembly has a tubular upper female coupling unit and a tubular lower female coupling unit. The diameter of these two coupling units is of a different size to avoid confusion when in an emergency situation. The smaller female coupling unit is fit onto the male neck adapter unit of the emergency signal balloon. When this connection is made, the helium canister is then threaded onto the lower female coupling unit of the piercing valve assembly. The piercing valve assembly houses a sharp piercing needle valve, centrally located therein. As the helium canister is screwed onto the piercing valve assembly, the sharp needle valve pierces the seal of the canister causing the pressurized helium gas to escape through the piercing needle valve into the emergency balloon. While the balloon is filling with helium it rises giving the signal to anyone within the visual area the signal, "CALL 911" and the user has thusly attracted the necessary aid.

Further included in the canister housing would be a quanity of double-stick adhesive pads. These pads would stick to the metal of a car or to the balloon surface. The purpose of these adhesive pads would be to provide a way of displaying an important sign, should the balloon fail to deploy properly. The user could simply attach the tape to the balloon surface or to any other object. The emergency message of "CALL 911" would still be displayed even though the balloon was damaged and laying on the ground.

Complete instructions for use of the emergency signal balloon apparatus would be imprinted on the back of the canister housing. On the front side of the housing would be imprinted the possible last date of safe usage of the unit. Because helium is a light gas, a container life would be important to the user. This time would probably be between seven to ten years. Should the invention not be used before the expiration date, the user would be advised to purchase a new helium canister.

DESCRIPTION OF THE DRAWING

FIG. 1 is a cross sectional elevation view of the canister housing with all of the components of the emergency signal balloon apparatus packaged therein;

FIG. 2 is an enlarged view of the piercing valve assembly with portions broken away to illustrate its interior;

FIG. 3 is a side elevation view illustrating the canister housing; and

FIG. 4 is a perspective view illustrating the emergency signal balloon apparatus as deployed in an emergency situation.

DESCRIPTION OF THE PREFERRED EMBODIMENT

Applicant's novel emergency signal balloon apparatus will now be described by referring to FIGS. 1-4 of the drawing. The emergency signal balloon apparatus is generally designated numeral 10.

Canister housing 12 has a bottom receptacle portion 14 and an upper receptacle lid portion 16. A carrying handle 18 is attached to upper receptacle lid portion 16. An expiraiton date indicator 19 is located on one of the side walls of bottom receptacle portion 14.

A helium cansiter 22 has a male threaded neck 23. A puncture seal 24 closes the top of the neck 23. A teflon coating 25 covers the interior wall of helium canister 22.

The emergency signal balloon 30 is packed in its deflated state in the upper receptacle lid portion 16. The mouth of the balloon has an externally threaded neck adapter unit 32 coupled thereto. A tethering line 36 would have its one end secured to the emergency signal balloon 30. Tether line 36 could have a plurality of attachment lines 37 that would have their one end attached to the midsection of the spherically shaped signal balloon. Portion 40 of the signal balloon would have an iridescant color and wedged shaped portions 42 would be made of a highly reflective silver material. The indicia 44 would be formed from highly reflective material.

Piercing valve assembly 50 is best illustrated in FIG. 2 and it has a tubular upper female coupling unit 52 with an internal threaded bore 53 whose diameter is D1. Tubular lower female coupling unit 55 has an internally threaded bore 56 having a diameter D2. A horizontal wall structure is provided between the bores 53 and 56 which has a central passage. A piercing needle valve 58 is mounted within the passage in the horizontal wall structure of piercing valve assembly 50. The external diameter of the male threaded neck 23 of helium canister 22 would be D2. The diameter of externally threaded neck adapter unit 32 would be D1. The supply of double stick adhesive patches 60 would also be stored within the canister housing 12.

The drawings as shown and thusly described represent the preferred embodiment invention. It would be obvious to one skilled in the art that modifications and changes, simple or complex, could be made to the preferred embodiment which would change the appearance of the invention but not the scope, spirit and intention of the invention. It is the intention of the inventors' to preclude the occurance of such modifications in design to the preferred embodiment of the invention through the following claims.

What is claimed is:

1. An emergency signal balloon apparatus comprising:
    a canister housing having a balloon receptacle portion and an upper receptacle lid portion, a carrying handle attached to said upper receptacle lid portion;
    a helium canister having an externally threaded neck having an external diameter D2, said helium canister being removably received in the balloon receptacle portion of said canister housing, said helium canister having a Teflon coating on its inner walls to prevent leakage of helium, a puncture seal closes the neck of the helium canister;
    an emergency signal balloon capable of being folded in its deflated state and removably packed in the upper receptacle lid portion of said canister housing, said signal balloon having an externally threaded neck adapter unit connected to its gas inflation port, said externally threaded neck adapter unit having and external diameter D1;
    said signal balloon having means thereon for providing a visual signal for help;
    valve assembly means for detachably engaging the threaded neck adapter of said emergency signal balloon and the externally threaded neck of said helium canisters to thereby form a fluid passage between said emergency signal balloon and said helium canister, said valve assembly means consisting entirely of an interiorly threaded tubular upper female coupling unit having an internal diameter D1 and an interiorly threaded tubular lower female coupling unit having an internal diameter D2, said units being connected by horizontal wall structure and a needle valve centrally mounted in a passage through said wall structure for piercing the puncture seal of said helium canister, said valve assembly means having no moving parts; and
    a predetermined length of tether line having one end connected to attachment means on said emergency signal balloon, said tether line being removably stored in said canister housing prior to inflation of said emergency signal balloon.

* * * * *